(12) United States Patent
Kim

(10) Patent No.: US 12,195,076 B2
(45) Date of Patent: Jan. 14, 2025

(54) VEHICLE STEERING COLUMN

(71) Applicant: HL Mando Corporation, Pyeongtaek-si (KR)

(72) Inventor: JeongRae Kim, Pyeongtaek-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 18/509,841

(22) Filed: Nov. 15, 2023

(65) Prior Publication Data
US 2024/0326896 A1 Oct. 3, 2024

(30) Foreign Application Priority Data

Apr. 3, 2023 (KR) ........................ 10-2023-0043555

(51) Int. Cl.
*B62D 1/183* (2006.01)
(52) U.S. Cl.
CPC .................................... *B62D 1/183* (2013.01)

(58) Field of Classification Search
CPC ........ B62D 1/185; B62D 1/195; B62D 1/184; B62D 1/19
See application file for complete search history.

(56) References Cited

U.S. PATENT DOCUMENTS

| | | | | |
|---|---|---|---|---|
| 2009/0282945 | A1* | 11/2009 | Streng | B62D 1/184 74/493 |
| 2010/0126300 | A1* | 5/2010 | Tokioka | B62D 1/185 464/172 |
| 2016/0075367 | A1* | 3/2016 | Sakuda | B62D 1/192 74/493 |
| 2016/0114827 | A1* | 4/2016 | Tanaka | B62D 1/185 74/493 |
| 2021/0024119 | A1* | 1/2021 | Ito | B62D 1/195 |

* cited by examiner

*Primary Examiner* — Toan C To
(74) *Attorney, Agent, or Firm* — Hauptman Ham, LLP

(57) ABSTRACT

The present embodiments provides a vehicle steering column that may more quickly and stably perform telescoping for adjusting the axial length of the steering column and stowing for drawing the steering wheel into or out of the dashboard, secure a convenient space for the driver, and provide safety and convenience to the driver.

19 Claims, 11 Drawing Sheets

VEHICLE STEERING COLUMN

CROSS-REFERENCE TO RELATED APPLICATION

The present application claims the benefit of priority to Korean Patent Application No. 10-2023-0043555, filed on Apr. 3, 2023 in the Korean Intellectual Property Office, the entire content of which is incorporated herein by reference.

TECHNICAL FIELD

The present disclosure relates to a vehicle steering column and, more specifically, to a vehicle steering column that may more quickly and stably perform telescoping for adjusting the axial length of the steering column and stowing for drawing the steering wheel into or out of the dashboard, secure a convenient space for the driver, and provide safety and convenience to the driver.

BACKGROUND

In general, the vehicle steering column comes with telescoping and tilting features by which the driver may adjust the protrusion and tilt angle of the steering wheel to fit his height or body shape to enable smooth steering.

Recent steer-by-wire (SBW) steering devices achieve vehicle steering using an electric motor, instead of components for mechanically linking components, such as universal joint or pinion shaft, between the steering wheel and the wheels.

The development of steer-by-wire steering devices leads to the development of steering columns capable of self-driving that transports the driver to the destination even without the driver's manipulation of the acceleration pedal or brake. A demand arises for securing a spacious room for the driver's convenience during self-driving.

To that end, a research effort is being made to increase the telescoping-in or out distance of the steering shaft or increase the stowing distance for drawing the steering wheel into or out of the dashboard.

In a conventional vehicle steering column, however, an increase in drawing-in/out distance results in slowdown of telescoping and excessive loads on the motor, screw bar, and screw nut, which may deteriorate safety and convenience for the driver and components.

Accordingly, there exists a need to expand research for a vehicle steering column capable of securing the driver's safety and convenience as well as stable and rapid operations even when the drawing-in/out distance of the vehicle steering column increases.

The information disclosed in the Background section above is to aid in the understanding of the background of the present disclosure, and should not be taken as acknowledgement that this information forms any part of prior art.

BRIEF SUMMARY

Conceived in the foregoing background, the present disclosure relates to a vehicle steering column that may more quickly and stably perform telescoping for adjusting the axial length of the vehicle steering column and stowing for drawing the steering wheel into or out of the dashboard.

Further, the present disclosure relates to a vehicle steering column capable of securing a space while drawing in/out the vehicle steering column and the steering wheel, providing a convenient space for the driver by increasing the drawing-in/out length, and quickly and stably performing drawing-in/out operation to provide convenience to the driver.

According to one exemplary embodiment of the present disclosure, a vehicle steering column may include a lower moving member to which a steering shaft is rotatably coupled, in which the steering shaft is axially drawn in or out during stowing, an intermediate member having a hollow shape into which the lower moving member is inserted and supporting an axial movement of the lower moving member, and a supporting member disposed in the intermediate member to radially support an outer circumferential surface of the lower moving member during the axial movement of the lower moving member.

In one exemplary embodiment, the intermediate member may have a spacer radially protruding outward to be spaced apart from the outer circumferential surface of the lower moving member, and the spacer may have a coupling hole to which the supporting member is coupled.

In one exemplary embodiment, the supporting member may include an insertion member inserted into the coupling hole and having a side end supporting the outer circumferential surface of the lower moving member and a coupling member coupled to the coupling hole to support the insertion member radially inward.

In one exemplary embodiment, the side end of the insertion member may have a protruding support protruding toward the outer circumferential surface of the lower moving member.

In one exemplary embodiment, the protruding support may have a curved surface convex toward the outer circumferential surface of the lower moving member.

In one exemplary embodiment, the supporting member may further include an elastic member coupled between the insertion member and the coupling member to apply an elastic force to two opposite sides thereof.

In one exemplary embodiment, the elastic member may have a fixing hole in a center portion thereof and include a tapered surface inclined toward the insertion member or the coupling member while extending radially outward.

In one exemplary embodiment, another side end of the insertion member may have a fixing protrusion inserted into the fixing hole of the elastic member.

In one exemplary embodiment, the supporting member may further include a ball member coupled to the side end of the insertion member to roll and support the axial movement of the lower moving member.

In one exemplary embodiment, the side end of the insertion member may have a supporting recess where the ball member is rotatably supported.

In one exemplary embodiment, the supporting member may include a roller member having a rotation shaft coupled to the side end of the insertion member to rotate and support the axial movement of the lower moving member.

In one exemplary embodiment, a protruding end portion radially protruding to radially press the insertion member may be disposed on the outer circumferential surface of the lower moving member.

In one exemplary embodiment, the protruding end portion may include a first protruding end portion disposed at a maximum drawn-out position when the lower moving member is stowed out and a second protruding end portion disposed at a maximum drawn-in position when the lower moving member is stowed in.

In one exemplary embodiment, the first protruding end portion may have a first inclined surface at an end portion facing the second protruding end portion. The first inclined surface may decrease in radial height toward the second protruding end portion and be connected to the outer circumferential surface of the lower moving member.

In one exemplary embodiment, the second protruding end portion may have a second inclined surface at an end portion facing the first protruding end portion. The second inclined surface may decrease in radial height toward the first protruding end portion and be connected to the outer circumferential surface of the lower moving member.

According to one exemplary embodiment of the present disclosure, a vehicle steering column may include a lower moving member to which a steering shaft is rotatably coupled, in which the steering shaft is axially drawn in or out by a lower actuator during stowing, and the lower moving member has a first protruding end portion and a second protruding end portion radially protruding on an outer circumferential surface thereof, the first protruding end portion being disposed at a maximum drawn-out position, and the second protruding end portion being disposed at a maximum drawn-in position, an intermediate member having a hollow shape into which the lower moving member is inserted, supporting an axial movement of the lower moving member, and having a spacer protruding to be spaced apart from the outer circumferential surface of the lower moving member, the spacer having a coupling hole radially formed, a supporting member including an insertion member having a side end inserted into the coupling hole to support the outer circumferential surface of the lower moving member from the first protruding end portion to the second protruding end portion and a coupling member coupled to the coupling hole to support the insertion member radially inward, the supporting member radially supporting the outer circumferential surface of the lower moving member when the intermediate member axially moves, a load sensor disposed in the coupling member to detect a load by which the insertion member supports the lower moving member, and an electronic controller controlling operation of the lower actuator according to a load value received from the load sensor.

In one exemplary embodiment, the lower actuator may include a lower motor generating a driving force with electrical energy, a lower screw bar rotated by the lower motor, and a lower screw nut engaged to the lower screw bar and coupled to the lower moving member.

In one exemplary embodiment, the electronic controller may control operation of the lower motor according to a draw-in signal value or a draw-out signal value of a stow switch manipulated by a driver and the load value received from the load sensor.

In one exemplary embodiment, when the draw-in signal value is received from the stow switch, the electronic controller may maintain operation of the lower motor in response to that the load value detected by the load sensor remains constant or decreases and stop operation of the lower motor in response to that the load value detected by the load sensor increases.

In one exemplary embodiment, when the draw-out signal value is received from the stow switch, the electronic controller may maintain operation of the lower motor in response to that the load value detected by the load sensor remains constant or decreases and stop operation of the lower motor in response to that the load value detected by the load sensor increases.

According to various embodiments of the present disclosure, it is possible to more quickly and stably perform telescoping for adjusting the axial length of the vehicle steering column and stowing for drawing the steering wheel into or out of the dashboard.

According to various embodiments of the present disclosure, it is possible to secure a space while drawing in/out the vehicle steering column and the steering wheel, provide a convenient space for the driver by increasing the drawing-in/out length, and quickly and stably perform drawing-in/out operation to provide convenience to the driver.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
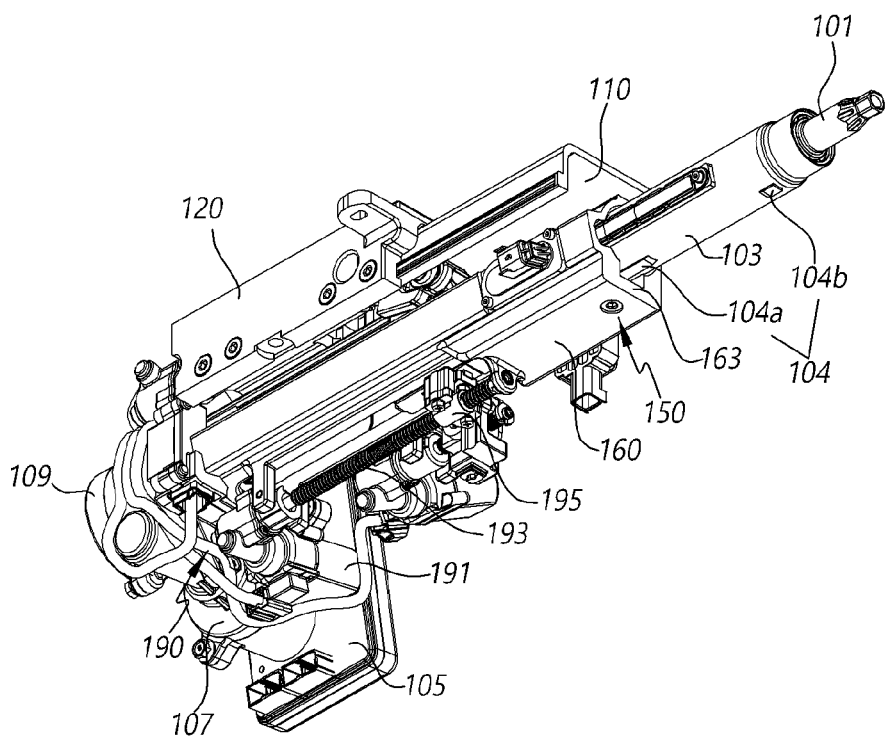
FIG. 1 is a perspective view illustrating a vehicle steering column according to various exemplary embodiments of the present disclosure.

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
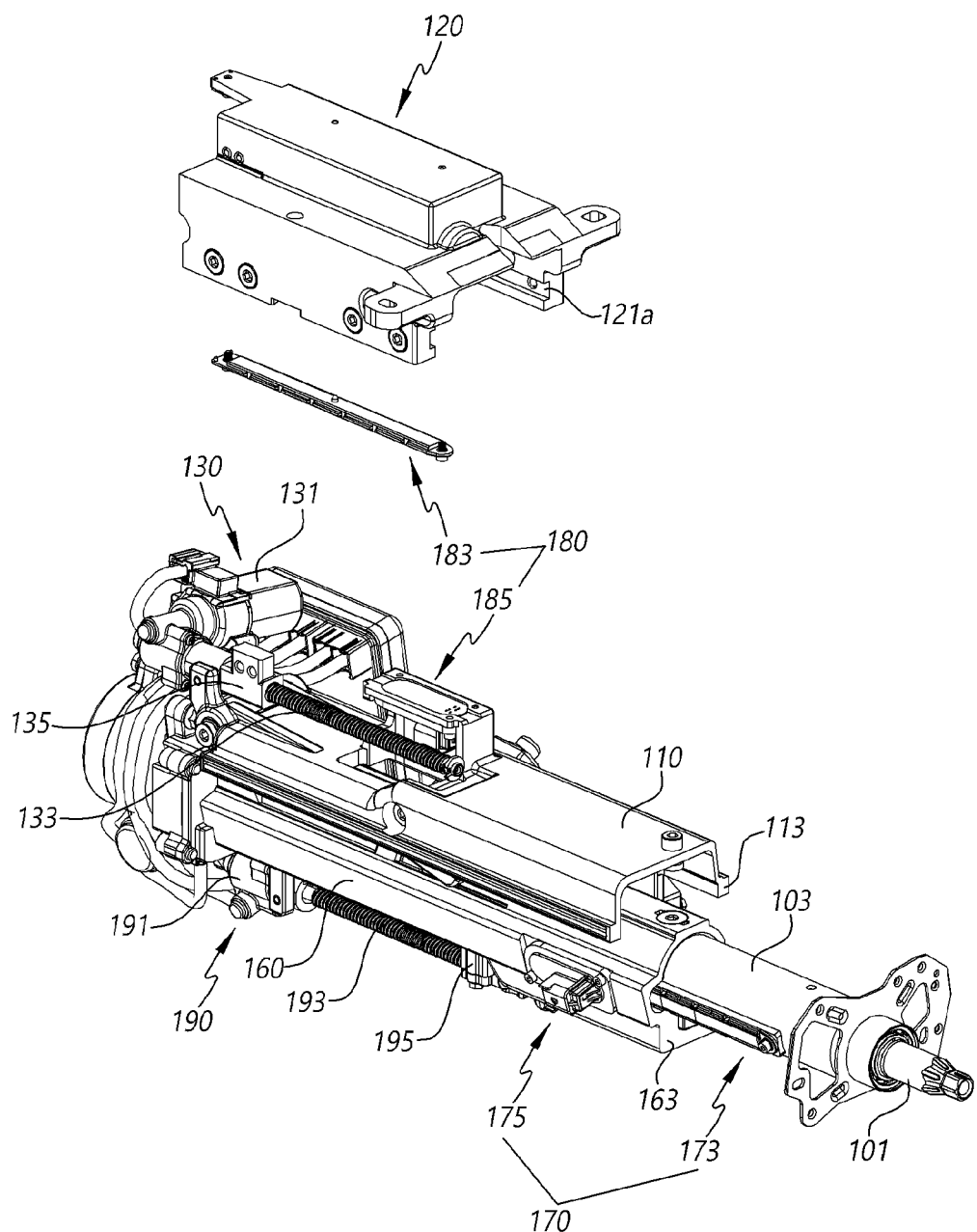
FIG. 2 is an exploded perspective view illustrating a steering column for a vehicle according to various exemplary embodiments of the present disclosure.
Figure 3:
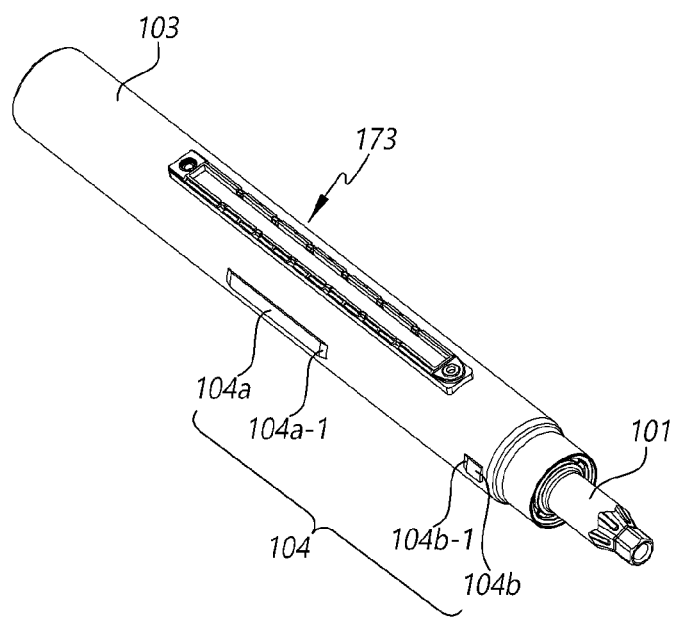
FIGS. 3 and 4 are perspective views illustrating a steering column for a vehicle according to various exemplary embodiments of the present disclosure.
Figure 4:
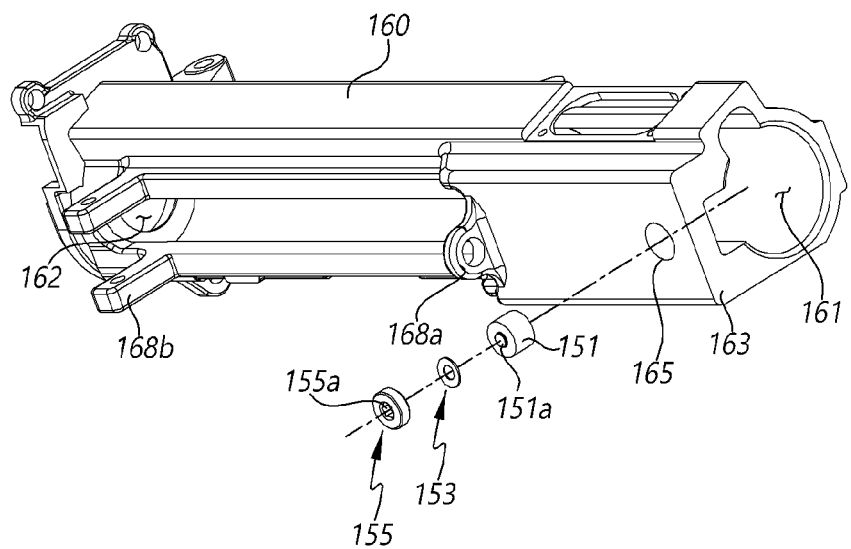
Figure 5:
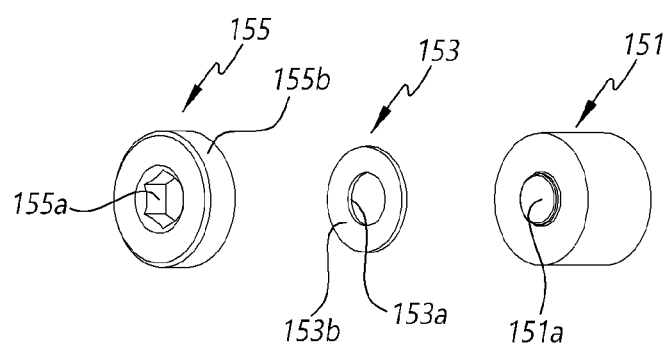
FIGS. 5 and 6 are exploded perspective views illustrating a steering column for a vehicle according to various exemplary embodiments of the present disclosure.
Figure 6:
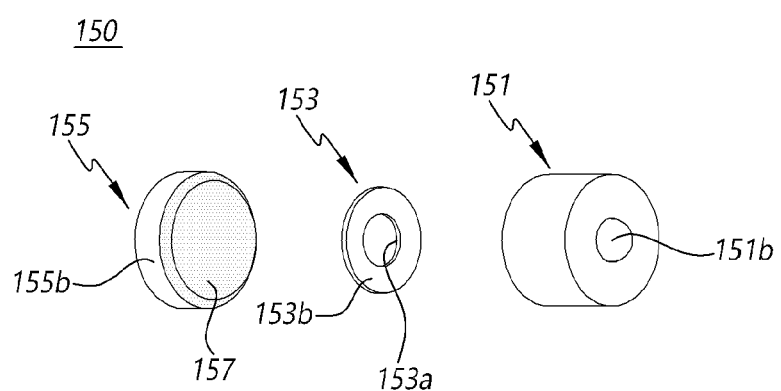
Figure 7:
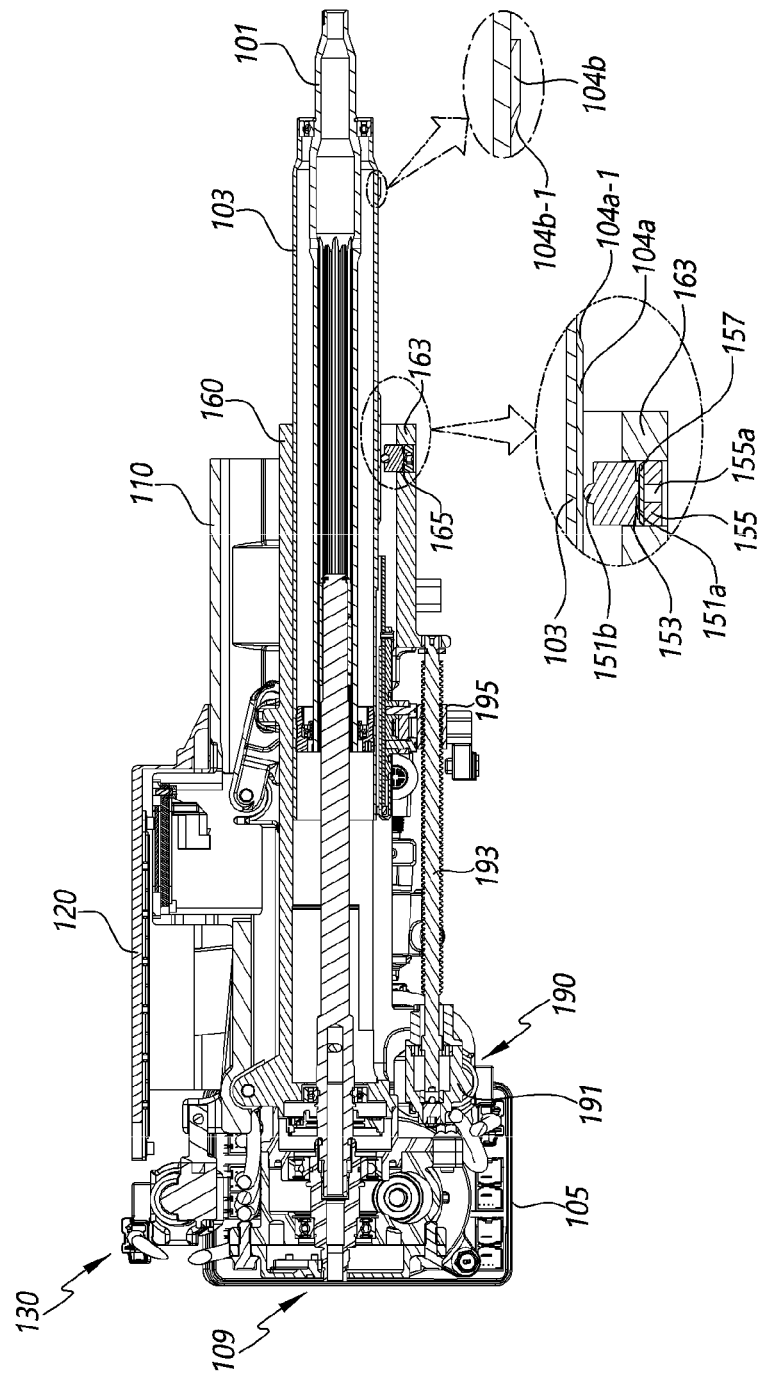
FIGS. 7, 8, and 9 are cross-sectional views illustrating a steering column for a vehicle according to various exemplary embodiments of the present disclosure.
Figure 8:
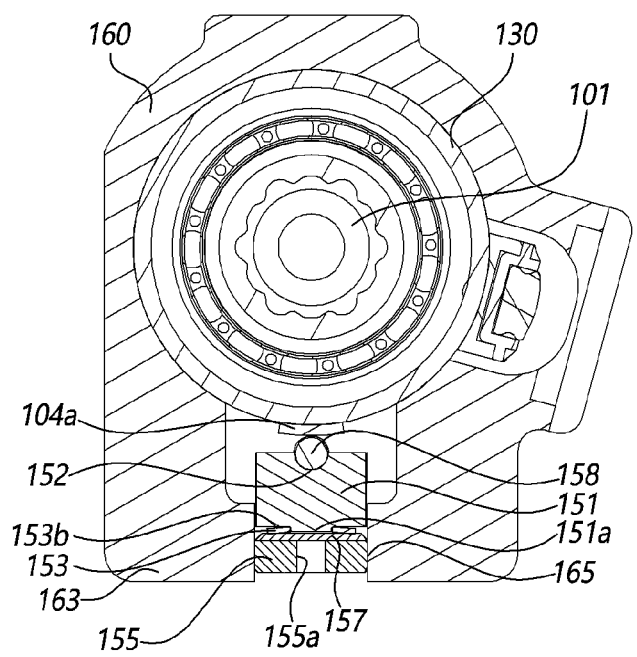
Figure 9:
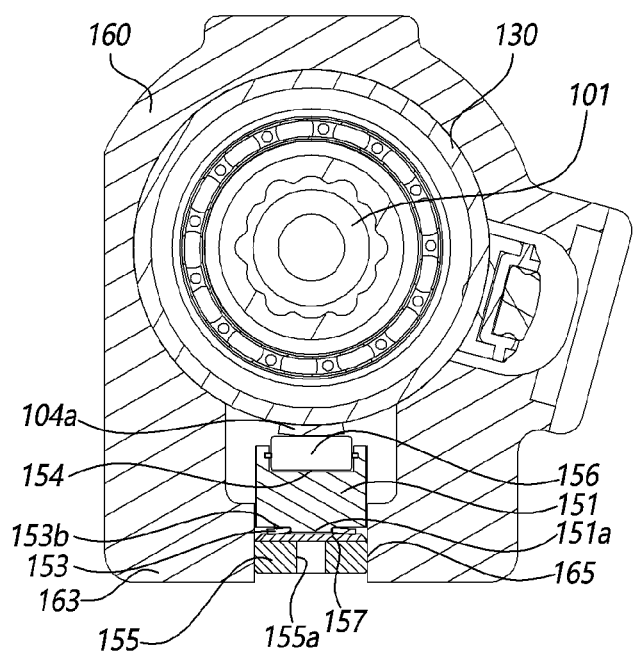
Figure 10:
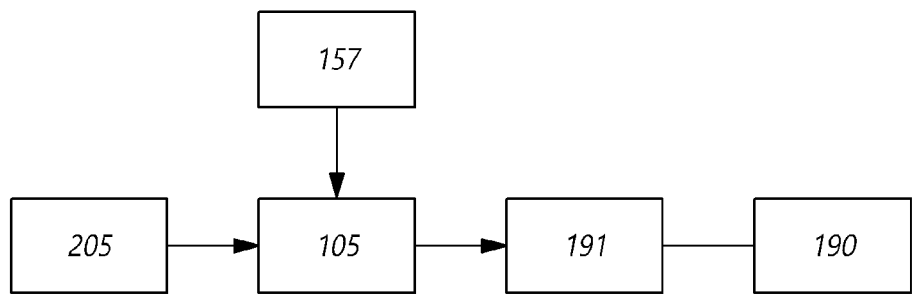
FIGS. 10 and 11 are configuration views illustrating control operations of a vehicle steering column according to various exemplary embodiments of the present disclosure.
Figure 11:
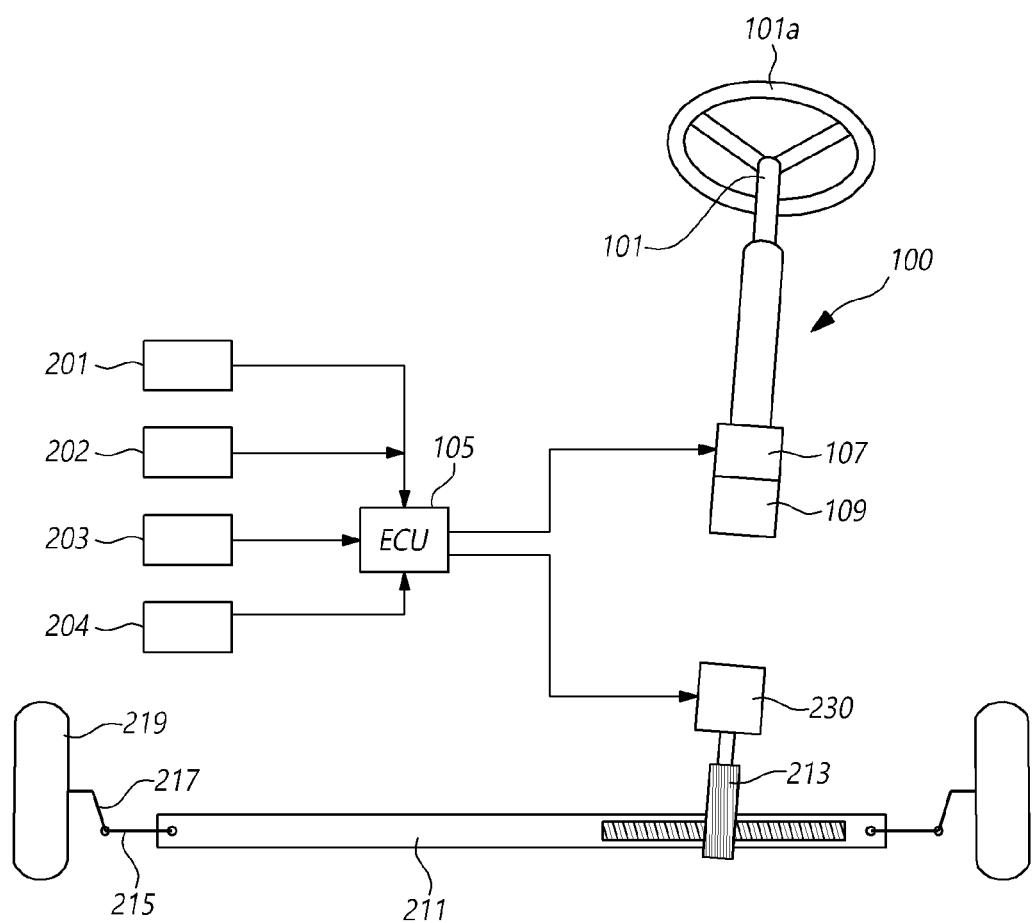

FIG. 1 is a perspective view illustrating a vehicle steering column according to various exemplary embodiments of the present disclosure. FIG. 2 is an exploded perspective view illustrating a steering column for a vehicle according to various exemplary embodiments of the present disclosure. FIGS. 3 and 4 are perspective views illustrating a steering column for a vehicle according to various exemplary embodiments of the present disclosure. FIGS. 5 and 6 are exploded perspective views illustrating a steering column for a vehicle according to various exemplary embodiments of the present disclosure. FIGS. 7, 8, and 9 are cross-sectional views illustrating a steering column for a vehicle according to various exemplary embodiments of the present disclosure. FIGS. 10 and 11 are configuration views illustrating control operations of a vehicle steering column according to various exemplary embodiments of the present disclosure.

In the following embodiments and FIGS. 1 to 11, 'upper side' denotes a direction toward the steering wheel 101a, and 'lower side' denotes the opposite direction. In stowing, 'draw in' denotes moving the steering wheel 101a to the lower side to reduce the axial length of the steering column 100, and 'draw out' denotes moving the steering wheel 101a to the upper side to increase the axial length of the steering column 100.

A vehicle steering column 100 includes a lower moving member 103 to which a steering shaft 101 is rotatably coupled, in which the steering shaft 101 is axially drawn in or out during stowing, an intermediate member 160 having a hollow shape into which the lower moving member 103 is inserted and supporting an axial movement of the lower moving member 103, and a supporting member 150 disposed in the intermediate member 160 to radially support an outer circumferential surface of the lower moving member 103 during the axial movement of the lower moving member 103.

The mounting bracket 120 has a fixing flange and a fixing hole for fixing to the vehicle body so that the steering column 100 is fixed to the vehicle body. The steering wheel 101a is coupled to an end of the steering shaft 101 so that the driver's steering is performed.

In the steering column 100 according to these embodiments, an upper moving member 110, which has guide portions 113 formed on two opposite sides thereof, is slidably coupled to guide holes 121a formed in two opposite surfaces of the mounting bracket 120 to be axially drawn in/out during stowing.

A lower moving member 103 which is formed as a hollow and allows the steering shaft 101 to be rotatably coupled thereinside is inserted into an intermediate member 160 which has a hollow shape so that drawing-in/output motion is performed in the axial direction during stowing.

In one exemplary embodiment, the stowing motion that is drawing-in/out in the axial direction denotes drawing the steering wheel 101a into or out of the dashboard by adjusting the length of the steering column 100 during autonomous driving mode and this includes telescoping that adjusts the length of the steering column 100 for the driver's convenience in general driver driving mode. The following description focuses primarily on stowing.

The upper moving member 110 is supported on the mounting bracket 120 by an upper actuator 130 and performs stowing that is drawing-in/out in the axial direction, and the lower moving member 103 is supported on the intermediate member 160 by a lower actuator 190 and performs stowing that is drawing-in/out in the axial direction.

The upper actuator 130 includes an upper motor 131 for generating a driving force with electrical energy, an upper screw bar 133 rotated by the upper motor 131, and an upper screw nut 135 coupled to the upper screw bar 133.

The upper motor 131 controlled by an electronic controller 105 rotates the upper screw bar 133. Thus, the upper screw nut 135 coupled to the upper moving member 110 is axially moved, so that the drawing-in/out of the upper moving member 110 is performed.

The lower actuator 190 includes a lower motor 191 for generating a driving force with electrical energy, a lower screw bar 193 rotated by the lower motor 191, and a lower screw nut 195 coupled to the lower screw bar 193.

The lower motor 191 controlled by the electronic controller 105 rotates the lower screw bar 193. Thus, the lower screw nut 195 coupled to the lower moving member 103 is axially moved, so that the drawing-in/out of the lower moving member 103 is performed.

The intermediate member 160 has a supporting member 150 so that the supporting member 150 may radially support the outer circumferential surface of the lower moving member 103 when the lower moving member 103 moves in the axial direction.

As stowing is performed while the supporting member 150 supports the outer circumferential surface of the lower moving member 103, it is possible to prevent vibration and noise that are generated due to a gap which is caused from a manufacturing or assembly error of the intermediate member 160 and the lower moving member 103 while drawing in/out the lower moving member 103.

Further, a spacer 163 protruding radially outward to be spaced apart from the outer circumferential surface of the lower moving member 103 is disposed at the lower end of the intermediate member 160, and the spacer 163 has a coupling hole 165 to which the supporting member 150 is coupled.

Accordingly, assembly is performed while adjusting the supporting force of the supporting member 150 in a state in which the lower moving member 103 and the intermediate member 160 are assembled while simultaneously securing a space where the supporting member 150 is installed to support the outer circumferential surface of the lower moving member 103, The supporting member 150 includes an insertion member 151 inserted into the coupling hole 165 to allow a side end thereof to support the outer circumferential surface of the lower moving member 103 and a coupling member 155 coupled to the coupling hole 165 to support the insertion member 151 radially inward.

An inner circumferential threaded portion is formed in the inner circumferential surface of the coupling hole 165, and an outer circumferential threaded portion screwed with the inner circumferential threaded portion of the coupling hole 165 is formed in the outer circumferential surface 155b of the coupling member 155, so that the supporting force for supporting the lower moving member 103 may be adjusted according to the degree of rotationally tightening of the coupling member 155 using a tool insertion hole 155a as described above.

One side end of the insertion member 151 has a protruding support 151b protruding toward the outer circumferential surface of the lower moving member 103, so that the lower moving member 103 is stowed in/out while the protruding support 151b supports the outer circumferential surface of the lower moving member 103.

The protruding support 151b is formed as a curved surface convex toward the outer circumferential surface of the lower moving member 103 to come in point contact with the outer circumferential surface of the lower moving member 103, thereby minimizing noise due to the contact.

The supporting member 150 may further include an elastic member 153 that is coupled between the insertion member 151 and the coupling member 155 to apply elastic force to two opposite sides.

The elastic member 153 has a fixing hole 153a in the center portion thereof and be formed as a tapered surface 153b that is inclined (see, e.g., FIG. 8 or 9) toward the insertion member 151 or the coupling member 155 from the center portion while extending radially outward. In one exemplary embodiment, an example is illustrated in which the tapered surface 153b is formed that is inclined toward the coupling member 155 while extending radially outward.

However, the supporting member 150 is not limited to the above-described shape or structure, and various exemplary embodiments of the present disclosure may be applied to any shape or structure capable of applying elastic force to two opposite sides between the insertion member 151 and the coupling member 155.

The other end of the insertion member 151 has a fixing protrusion 151a inserted into the fixing hole 153a of the elastic member 153.

Accordingly, when the supporting member 150 is assembled, assembly is rendered possible by the coupling member 155 in a state in which the elastic member 153 is inserted in the fixing protrusion 151a. Thus, assemblability is enhanced, and the elastic member 153 may generate elastic force at the precise position.

Further, the supporting member 150 may further include a ball member 158 that is coupled to the one side end of the insertion member 151 to roll and support the axial movement of the lower moving member 103 as shown in FIG. 8.

In this case, the one side end of the insertion member 151 may have a supporting recess 152 where the ball member 158 is rotatingly supported.

Further, as shown in FIG. 9, the supporting member 150 may further include a roller member 156 that has a rotation shaft coupled to the one side end of the insertion member 151 to rotate and support the axial movement of the lower moving member 103.

Meanwhile, as a protruding end portion 104 radially protruding to radially press the insertion member 151 is disposed on the outer circumferential surface of the lower moving member 103, a difference may occur in the force for supporting the lower moving member 103.

The protruding end portion 104 may include a first protruding end portion 104a disposed at the maximum drawn-out position when the lower moving member 103 is stowed out and a second protruding end portion 104b disposed at the maximum drawn-in position when the lower moving member 103 is stowed in.

In other words, if the lower moving member 103 reaches the maximum drawn-out position when stowed out, the supporting member 150 is supported by the first protruding end portion 104a and, if the lower moving member 103 reaches the maximum drawn-in position when stowed in, the supporting member 150 is supported by the second protruding end portion 104b.

Therefore, if the lower moving member 103 reaches the maximum drawn-in position or maximum drawn-out position when stowed in or out, the force by which the supporting member 150 supports the lower moving member 103 increases, stopping the draw-in or draw-out motion. Thus, the lower moving member 103 may be more securely supported by the intermediate member 160 at the maximum drawn-in position and the maximum drawn-out position.

Further, an end portion of the first protruding end portion 104a, which faces the second protruding end portion 104b, may have a first inclined surface 104a-1 that decreases in radial height toward the second protruding end portion 104b and is connected to the outer circumferential surface of the lower moving member 103.

Further, an end portion of the second protruding end portion 104b, which faces the first protruding end portion 104a, may have a second inclined surface 104b-1 that decreases in radial height toward the first protruding end portion 104a and is connected to the outer circumferential surface of the lower moving member 103.

Accordingly, as the lower moving member 103 approaches the maximum drawn-in position and maximum drawn-out position when stowed in or out, the supporting force of the supporting member 150 gradually increases, so that it may be more securely supported with the intermediate member 160, reducing tremors or vibrations of the entire steering column 100 while giving stable support.

Referring to FIGS. 10 and 11 together with FIGS. 1 to 9, a vehicle steering column 100 according to various embodiments of the present disclosure includes a lower moving member 103 to which a steering shaft 101 is rotatably coupled, in which the steering shaft 101 is axially drawn in or out by a lower actuator 190 during stowing. The lower moving member 103 has a first protruding end portion 104a and a second protruding end portion 104b radially protruding on an outer circumferential surface thereof, the first protruding end portion 104a being disposed at a maximum drawn-out position, and the second protruding end portion 104b being disposed at a maximum drawn-in position. The vehicle steering column 100 further includes an intermediate member 160 having a hollow shape into which the lower moving member 103 is inserted, supporting an axial movement of the lower moving member 103, and having a spacer 163 protruding to be spaced apart from the outer circumferential surface of the lower moving member 103, the spacer 163 having a coupling hole 165 radially formed, a supporting member 150 including an insertion member 151 having a side end inserted into the coupling hole 165 to support the outer circumferential surface of the lower moving member 103 from the first protruding end portion 104a to the second protruding end portion 104b and a coupling member 155 coupled to the coupling hole 165 to radially support the insertion member 151 inward, the supporting member 150 radially supporting the outer circumferential surface of the lower moving member 103 when the intermediate member 160 axially moves, a load sensor 157 disposed in the coupling member 155 to detect a load by which the insertion member 151 supports the lower moving member 103, and an electronic controller 105 controlling operation of the lower actuator 190 according to a load value received from the load sensor 157.

Here, the upper moving member 110, intermediate member 160, lower moving member 103, and supporting member 150 are the same as those described above, and no detailed description thereof is given below.

The lower actuator 190 may include a lower motor 191 generating a driving force with electrical energy, a lower screw bar 193 rotated by the lower motor 191, and a lower screw nut 195 engaged to the lower screw bar 193 and coupled to the lower moving member 103.

An end of the lower screw bar 193 is rotatably coupled to a first fixing portion 168a disposed on one side of the intermediate member 160, and the other end of the lower screw bar 193 is rotatably coupled to a second fixing portion 168b disposed on the other side of the intermediate member 160.

The lower screw nut 195 engaged and coupled to the lower screw bar 193 is coupled to an end portion of the lower moving member 103, axially moving the lower moving member 103 if the lower screw bar 193 is rotated when the lower motor 191 operates.

The load sensor 157 is disposed at a lower end of the coupling member 155 and detects the load by which the insertion member 151 supports the lower moving member 103 and transmits the detected load to the electronic controller 105.

The electronic controller 105 may control the operation of the lower motor 191 according to the draw-in signal value or draw-out signal value of the stow switch 205 operated by the driver and the load value received from the load sensor 157.

When the draw-in signal value is received from the stow switch 205, the electronic controller 105 may maintain operation of the lower motor 191 in the draw-in state if the load value detected by the load sensor 157 remains constant or decreases and stop operation of the lower motor 191 if the load value detected by the load sensor 157 increases.

In other words, if the draw-in signal value is received in a state in which the supporting member 150 is positioned between the first protruding end portion 104a and the second protruding end portion 104b, the load value detected by the load sensor 157 remains constant. Thus, the operation of the lower motor 191 is maintained in the draw-in state, continuing the stow-in motion.

If the draw-in signal value is received in a state in which the supporting member 150 is positioned at the first protruding end portion 104a, the load value detected by the load sensor 157 is decreased and then remains constant. Thus, the operation of the lower motor 191 is maintained in the draw-in state, continuing the stow-in motion.

If the supporting member 150 is positioned at the second protruding end portion 104b after the operation of the lower motor 191 is maintained in the draw-in state, the load value detected by the load sensor 157 increases. Thus, the operation of the lower motor 191 is stopped, terminating the stow-in motion.

Further, when the draw-out signal value is received from the stow switch 205, the electronic controller 105 may maintain operation of the lower motor 191 in the draw-out state if the load value detected by the load sensor 157 remains constant or decreases and stop operation of the lower motor 191 if the load value detected by the load sensor 157 increases.

In other words, if the draw-out signal value is received in a state in which the supporting member 150 is positioned between the first protruding end portion 104a and the second protruding end portion 104b, the load value detected by the load sensor 157 remains constant. Thus, the operation of the lower motor 191 is maintained in the draw-out state, continuing the stow-out motion.

If the draw-out signal value is received in a state in which the supporting member 150 is positioned at the second protruding end portion 104b, the load value detected by the load sensor 157 is decreased and then remains constant. Thus, the operation of the lower motor 191 is maintained in the draw-out state, continuing the stow-out motion.

If the supporting member 150 is positioned at the first protruding end portion 104a after the operation of the lower motor 191 is maintained in the draw-out state, the load value detected by the load sensor 157 increases. Thus, the operation of the lower motor 191 is stopped, terminating the stow-out motion.

Further, in one exemplary embodiment, an upper position sensor and a lower position sensor may further be included in addition to the load sensor, to more precisely detect position information during stowing of the upper moving member 110 and the lower moving member 103.

The upper position sensor 180 may include an upper magnet 183 coupled and fixed to an inner surface of the mounting bracket 120 and an upper sensor 185 disposed on an outer surface of the upper moving member 110 to detect a change in the magnetic field of the upper magnet 183.

The lower position sensor 170 may include a lower magnet 173 coupled to the outer circumferential surface of the lower moving member 103 and a lower sensor 175 disposed on the intermediate member 160 to detect a change in the magnetic field of the lower magnet 173.

Therefore, the upper position sensor 180 detects the axial position of the upper moving member 110 with respect to the mounting bracket 120 and transmits it to the electronic controller 105, and the lower position sensor 170 detects the axial position of the lower moving member 103 with respect to the intermediate member 160 and transmits it to the electronic controller 105. Thus, it is possible to detect more precise position information during stowing of the upper moving member 110 and the lower moving member 103.

The vehicle steering column 100 according to one exemplary embodiment may be applied to a vehicle steering device that is capable of self-driving, as well as a vehicle steering device that is steered by the driver.

Referring to FIG. 11 which illustrates a steer-by-wire steering device capable of self-driving, when the driver manipulates the steering wheel 101a, an angle sensor 201 and a torque sensor 202 are operated to detect the driver's manipulation and send an electrical signal to the electronic controller 105 to thereby operate the steering wheel motor 107 and the pinion shaft motor 230.

The electronic controller 105 controls the steering wheel motor 107 and the pinion shaft motor 230 based on the electrical signals transmitted from the angle sensor 201 and the torque sensor 202 and electrical signals transmitted from other various sensors mounted to the vehicle.

The steering wheel motor 107 is connected to a reducer (not shown) for reducing the number of rotations of the motor to rotate the steering shaft 101. In normal driving, the steering wheel motor 107 provides a reaction force to the steering wheel 101a so that the driver may feel the steering reaction force in the opposite direction when manipulating the steering wheel 101a. In autonomous driving, steering is performed under the control of the electronic controller 105 without the driver's involvement.

The pinion shaft motor 230 may slide the rack bar 211 connected to the pinion shaft 213 to steer the wheels 219 on two opposite sides through the tie rods 215 and the knuckle arms 217.

Although FIG. 11 illustrates an example in which an angle sensor 201, a torque sensor 202, a vehicle velocity sensor 203 for transmitting steering information to the electronic controller 105, and a wheel rotational angle sensor 204 are provided for convenience of description, a motor position sensor, various radars or lidars, or image sensors, such as cameras, may further be provided, which are not described in detail.

In such a steer-by-wire steering device, since the steering wheel 101a and the wheel 219 are not mechanically connected to each other, a mechanical limitation is required to stop the rotation of the steering wheel 101a at a predetermined angle when the steering wheel 101a is operated by the driver.

Accordingly, a rotational angle limiting member 109 may be provided to mechanically limit the rotational angle of the steering wheel 101a to stop the steering wheel 101a from further rotation when the rotation of the wheel 119 reaches the maximum point (when the steering wheel 101a or the wheel 119 is in a full-turn state in the general steering device).

According to various exemplary embodiments of the present disclosure, it is possible to more quickly and stably perform telescoping for adjusting the axial length of the vehicle steering column and stowing for drawing the steering wheel into or out of the dashboard.

According to various exemplary embodiments of the present disclosure, it is possible to secure a space while drawing in/out the vehicle steering column and the steering wheel, provide a convenient space for the driver by increasing the drawing-in/out length, and quickly and stably perform drawing-in/out operation to provide convenience to the driver.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed:

1. A vehicle steering column, comprising:
   a lower moving member to which a steering shaft is rotatably coupled, wherein the steering shaft is axially drawn in or out during stowing;
   an intermediate member having a hollow shape into which the lower moving member is inserted and supporting an axial movement of the lower moving member; and
   a supporting member disposed in the intermediate member to radially support an outer circumferential surface of the lower moving member during the axial movement of the lower moving member,
   wherein the intermediate member has a spacer radially protruding outward to be spaced apart from the outer circumferential surface of the lower moving member, and wherein the spacer has a coupling hole to which the supporting member is coupled.

2. The vehicle steering column of claim 1, wherein the supporting member includes:
   an insertion member inserted into the coupling hole and having a side end supporting the outer circumferential surface of the lower moving member; and
   a coupling member coupled to the coupling hole to support the insertion member radially inward.

3. The vehicle steering column of claim 2, wherein the side end of the insertion member has a protruding support protruding toward the outer circumferential surface of the lower moving member.

4. The vehicle steering column of claim 3, wherein the protruding support has a curved surface convex toward the outer circumferential surface of the lower moving member.

5. The vehicle steering column of claim 2, wherein the supporting member further includes an elastic member coupled between the insertion member and the coupling member to apply an elastic force to two opposite sides thereof.

6. The vehicle steering column of claim 5, wherein the elastic member has a fixing hole in a center portion thereof and includes a tapered surface inclined toward the insertion member or the coupling member while extending radially outward.

7. The vehicle steering column of claim 6, wherein another side end of the insertion member has a fixing protrusion inserted into the fixing hole of the elastic member.

8. The vehicle steering column of claim 2, wherein the supporting member further includes a ball member coupled to the side end of the insertion member to roll and support the axial movement of the lower moving member.

9. The vehicle steering column of claim 8, wherein the side end of the insertion member has a supporting recess where the ball member is rotatably supported.

10. The vehicle steering column of claim 2, wherein the supporting member includes a roller member having a rotation shaft coupled to the side end of the insertion member to rotate and support the axial movement of the lower moving member.

11. The vehicle steering column of claim 2, wherein a protruding end portion radially protruding to radially press the insertion member is disposed on the outer circumferential surface of the lower moving member.

12. The vehicle steering column of claim 11, wherein the protruding end portion includes:
   a first protruding end portion disposed at a maximum drawn-out position when the lower moving member is stowed out; and
   a second protruding end portion disposed at a maximum drawn-in position when the lower moving member is stowed in.

13. The vehicle steering column of claim 12, wherein the first protruding end portion has a first inclined surface at an end portion facing the second protruding end portion, and
   wherein the first inclined surface decreases in radial height toward the second protruding end portion and is connected to the outer circumferential surface of the lower moving member.

14. The vehicle steering column of claim 12, wherein the second protruding end portion has a second inclined surface at an end portion facing the first protruding end portion, and
   wherein the second inclined surface decreases in radial height toward the first protruding end portion and is connected to the outer circumferential surface of the lower moving member.

15. A vehicle steering column, comprising:
   a lower moving member to which a steering shaft is rotatably coupled, wherein the steering shaft is axially drawn in or out by a lower actuator during stowing, wherein the lower moving member has a first protruding end portion and a second protruding end portion radially protruding on an outer circumferential surface thereof, the first protruding end portion being disposed at a maximum drawn-out position, and the second protruding end portion being disposed at a maximum drawn-in position;
   an intermediate member having a hollow shape into which the lower moving member is inserted, supporting an axial movement of the lower moving member, and having a spacer protruding to be spaced apart from the outer circumferential surface of the lower moving member, the spacer having a coupling hole radially formed;
   a supporting member including:
      an insertion member having a side end inserted into the coupling hole to support the outer circumferential surface of the lower moving member from the first protruding end portion to the second protruding end portion; and
      a coupling member coupled to the coupling hole to support the insertion member radially inward, the supporting member radially supporting the outer circumferential surface of the lower moving member when the intermediate member axially moves;
   a load sensor disposed in the coupling member to detect a load by which the insertion member supports the lower moving member; and
   an electronic controller configured to control operation of the lower actuator according to a load value received from the load sensor.

16. The vehicle steering column of claim 15, wherein the lower actuator includes:
   a lower motor generating a driving force with electrical energy;
   a lower screw bar rotated by the lower motor; and
   a lower screw nut engaged to the lower screw bar and coupled to the lower moving member.

17. The vehicle steering column of claim 16, wherein the electronic controller controls operation of the lower motor according to a draw-in signal value or a draw-out signal value of a stow switch manipulated by a driver and the load value received from the load sensor.

18. The vehicle steering column of claim 17, wherein when the draw-in signal value is received from the stow switch, the electronic controller maintains operation of the lower motor in response to that the load value detected by the load sensor remains constant or decreases, and stops operation of the lower motor in response to that the load value detected by the load sensor increases.

19. The vehicle steering column of claim 18, wherein when the draw-out signal value is received from the stow switch, the electronic controller maintains operation of the lower motor in response to that the load value detected by the load sensor remains constant or decreases, and stops operation of the lower motor in response to that the load value detected by the load sensor increases.

* * * * *